(12) United States Patent
Sobanski (10) Patent No.: US 11,549,378 B1
(45) Date of Patent: Jan. 10, 2023

(54) AIRFOIL ASSEMBLY WITH COMPOSITE RINGS AND SEALING SHELF

(71) Applicant: Raytheon Technologies Corporation, Farmington, CT (US)

(72) Inventor: Jon E. Sobanski, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/832,256

(22) Filed: Jun. 3, 2022

(51) Int. Cl.
  *F01D 5/18* (2006.01)
  *F01D 5/28* (2006.01)

(52) U.S. Cl.
  CPC ............ *F01D 5/189* (2013.01); *F01D 5/282* (2013.01); *F01D 5/284* (2013.01); *F05D 2260/201* (2013.01); *F05D 2300/6033* (2013.01)

(58) Field of Classification Search
  CPC .......... F01D 5/189; F01D 5/282; F01D 5/284; F01D 9/041; F05D 2260/201; F05D 2300/6033; F05D 2240/12; F05D 2240/129
  See application file for complete search history.

(56) References Cited

U.S. PATENT DOCUMENTS

| | | | |
|---|---|---|---|
| 4,403,917 A | 9/1983 | Laffitte et al. | |
| 4,461,612 A | 7/1984 | Dodd | |
| 4,616,976 A | 10/1986 | Lings et al. | |
| 5,538,394 A | 7/1996 | Inomata et al. | |
| 7,093,359 B2 | 8/2006 | Morrison et al. | |
| 7,094,021 B2 * | 8/2006 | Haubert | F01D 9/041 |
| | | | 416/193 A |
| 3,052,378 A1 | 11/2011 | Draper | |
| 9,004,866 B2 | 4/2015 | Lee et al. | |
| 9,017,035 B2 | 4/2015 | Marmilic et al. | |
| 9,194,236 B2 | 11/2015 | Nakamata et al. | |
| 9,303,520 B2 * | 4/2016 | Hasting | F01D 9/042 |
| 9,777,585 B2 * | 10/2017 | Drane | F01D 9/041 |
| 9,915,154 B2 | 3/2018 | Berczik et al. | |
| 10,100,645 B2 | 10/2018 | Lewis et al. | |
| 10,196,920 B2 | 2/2019 | Subramanian et al. | |
| 10,301,954 B2 | 5/2019 | Mien et al. | |
| 10,337,332 B2 | 7/2019 | Auxier et al. | |
| 10,358,939 B2 | 7/2019 | Walston et al. | |
| 10,415,399 B2 * | 9/2019 | Ducharme | C04B 35/80 |
| 10,844,732 B2 | 11/2020 | Harding | |
| 11,162,372 B2 * | 11/2021 | Whittle | F01D 5/284 |

(Continued)

*Primary Examiner* — Eldon T Brockman
(74) *Attorney, Agent, or Firm* — Carlson, Gaskey & Olds, P.C.

(57) ABSTRACT

An airfoil assembly includes first and second fiber-reinforced composite airfoil rings each having inner and outer platform sections. A sealing shelf extends from a suction side wall of one of the first and second fiber-reinforced composite airfoil rings, and towards the pressure side wall of the other of the rings. A first seal is captured radially inwardly of the sealing shelves on outer platforms of each of the first and second fiber-reinforced composite airfoil rings. A second seal is captured inward of the sealing shelves on the inner platforms of each of the first and second fiber-reinforced composite rings to provide a seal between the respective first and second fiber-reinforced composite airfoil rings, and a captured internal component. A gas turbine engine is also disclosed.

20 Claims, 8 Drawing Sheets

(56) References Cited

U.S. PATENT DOCUMENTS

| | | | |
|---|---|---|---|
| 2014/0064956 A1* | 3/2014 | Drane | F01D 5/282 |
| | | | 415/209.3 |
| 2014/0140832 A1* | 5/2014 | Hasting | F01D 25/246 |
| | | | 415/190 |
| 2016/0281517 A1 | 9/2016 | Kim et al. | |
| 2019/0063233 A1* | 2/2019 | Ducharme | C04B 35/80 |
| 2020/0003060 A1 | 1/2020 | Rodriguez et al. | |
| 2021/0172327 A1* | 6/2021 | Whittle | F01D 5/282 |
| 2021/0381383 A1* | 12/2021 | Marsh | F01D 5/147 |

\* cited by examiner

AIRFOIL ASSEMBLY WITH COMPOSITE RINGS AND SEALING SHELF

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

In a featured embodiment, an airfoil assembly includes first and second fiber-reinforced composite airfoil rings each having inner and outer platform sections. A suction side wall extends between the inner and outer platforms. A pressure side wall extends between the inner and outer platforms. The first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil. There is a sealing shelf extending from the suction side wall of one of the first and second fiber-reinforced composite airfoil rings, and extending toward the pressure side wall of the other of the first and second fiber-reinforced composite rings. The sealing shelves are formed as an extension from each of the inner and outer platforms on each of the first and second fiber-reinforced composite airfoil rings. A first seal is captured radially inwardly of the sealing shelves on outer platforms of each of the first and second fiber-reinforced composite airfoil rings. A second seal is captured inward of the sealing shelves on the inner platforms of each of the first and second fiber-reinforced composite rings to provide a seal between the respective first and second fiber-reinforced composite airfoil rings, and a captured internal component.

In another embodiment according to the previous embodiment, the airfoil defines a leading edge and a trailing edge, and the interface extends through at least one of the leading edge or the trailing edge.

In another embodiment according to any of the previous embodiments, each of the first and second fiber-reinforced composite airfoil rings includes an endless braid.

In another embodiment according to any of the previous embodiments, the fiber-reinforced composite of the first and second fiber-reinforced composite airfoil rings is ceramic matrix composite.

In another embodiment according to any of the previous embodiments, the fiber-reinforced composite of the first and second fiber-reinforced composite airfoil rings is ceramic matrix composite.

In another embodiment according to any of the previous embodiments, the captured internal component is a jumper tube having an inlet to be connected to receive compressed air and deliver air to an opposed radial side of the inlet to an outlet.

In another embodiment according to any of the previous embodiments, the captured component is a baffle tube, having an inlet to receive compressed air, and having a plurality of impingement cooling holes to deliver the compressed air to the suction side wall of one of the fiber-reinforced composite airfoil rings, and also to the pressure side wall of the other of the first and second fiber-reinforced composite airfoil rings.

In another embodiment according to any of the previous embodiments, there is at least one intermediate sealing shelf receiving at least one intermediate seal between the radially inner and outer platforms, to provide subpressure chambers within a cavity defined between the first and second fiber-reinforced composite airfoil rings. There are film cooling holes in an outer face of the airfoil associated with each of the plurality of subpressure zones.

In another embodiment according to any of the previous embodiments, the captured internal component has flanges which are thin and flexible and received between the sealing shelves associated with the inner and outer platforms and the first and second seals.

In another embodiment according to any of the previous embodiments, each of the sealing shelves associated with the pressure side wall and the suction side wall, and at the inner and outer platforms defining a triangular space such that the first and second seals are forced into a compressed position in the triangular space.

In another featured embodiment, a gas turbine engine includes a compressor section. A combustor is in fluid communication with the compressor section. A turbine section is in fluid communication with the combustor. The turbine section has a plurality of airfoil assemblies disposed about a central axis of the gas turbine engine. Each of the airfoil assemblies includes first and second fiber-reinforced composite airfoil rings each having inner and outer platform sections. A suction side wall extends between the inner and outer platforms. A pressure side wall extends between the inner and outer platforms. The first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil. A plurality of first and second fiber-reinforced composite airfoil rings circumscribes a rotational axis of the engine. There is a sealing shelf extending from the suction side wall of one of the first and second fiber-reinforced composite airfoil rings, and extending toward the pressure side wall of the other of the first and second fiber-reinforced composite rings, with the sealing shelves being formed as an extension from each of the inner and outer platforms on each of the first and second fiber-reinforced composite airfoil rings. A first seal is captured radially inwardly of the sealing shelves on the outer platforms of each of the first and second fiber-reinforced composite airfoil rings and a second seal captured inward of the sealing shelves on the inner platforms of the first and second fiber-reinforced composite rings to provide a seal between the respective first and second fiber-reinforced composite airfoil rings, and a captured internal component.

In another embodiment according to any of the previous embodiments, the airfoil defines a leading edge and a trailing edge, and the interface extends through at least one of the leading edge or the trailing edge.

In another embodiment according to any of the previous embodiments, each of the first and second fiber-reinforced composite airfoil rings includes an endless braid.

In another embodiment according to any of the previous embodiments, the fiber-reinforced composite of the first and second fiber-reinforced composite airfoil rings is ceramic matrix composite.

In another embodiment according to any of the previous embodiments, the fiber-reinforced composite of the first and second fiber-reinforced composite airfoil rings is ceramic matrix composite.

In another embodiment according to any of the previous embodiments, the captured internal component is a jumper tube having an inlet to be connected to receive compressed air and deliver air to an opposed radial side of the inlet to an outlet.

In another embodiment according to any of the previous embodiments, the captured component is a baffle. The baffle has an inlet to receive compressed air, and has a plurality of impingement cooling holes to deliver the compressed air to the suction side wall of one of the fiber-reinforced composite airfoil rings, and also to the pressure side wall of the other of the first and second fiber-reinforced composite airfoil rings.

In another embodiment according to any of the previous embodiments, there is at least one intermediate sealing shelf receiving at least one intermediate seal between the radially inner and outer platforms, to provide subpressure chambers within a cavity defined between the first and second fiber-reinforced composite airfoil rings, and there being film cooling holes in an outer face of the airfoil associated with each of the plurality of subpressure zones.

In another embodiment according to any of the previous embodiments, the captured internal component has flanges which are thin and flexible and received between the sealing shelves associated with the inner and outer platforms and the first and second seals.

In another embodiment according to any of the previous embodiments, each of the sealing shelves associated with the pressure side wall and the suction side wall, and at the inner and outer platforms defining a triangular space such that the first and second seals are forced into a compressed position in the triangular space.

The present disclosure may include any one or more of the individual features disclosed above and/or below alone or in any combination thereof.

These and other features may be best understood from the following specification and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
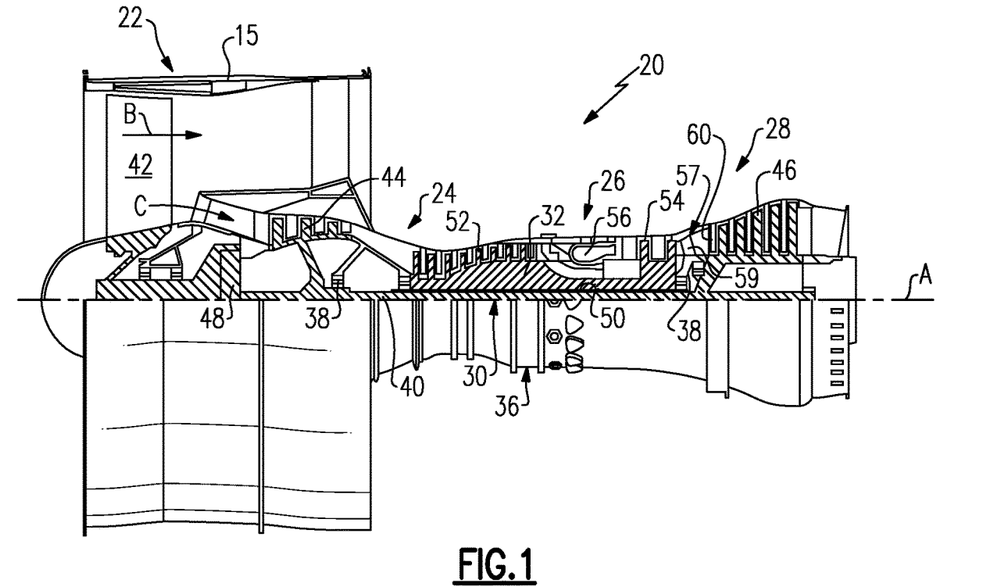
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

Figure 2:
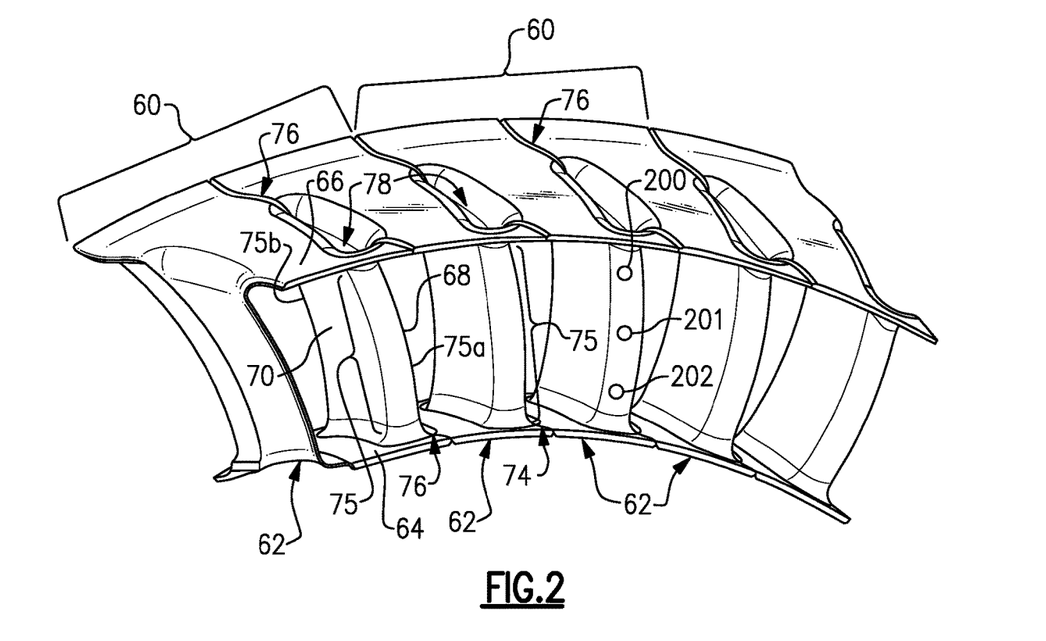
FIG. 2 illustrates a vane assembly.

FIG. 2 illustrates vane assemblies 60 from the turbine section 28 of the engine 20 (see also FIG. 1). It is to be understood that although the examples herein are discussed in context of a vane assembly from the turbine section 28, the examples can be applied to vanes in other sections of the engine 20. The vane assemblies 60 are generally arranged about the engine central axis A to form a full row of vanes and may be supported in the engine 20 via support hardware (not shown).

Figure 3:
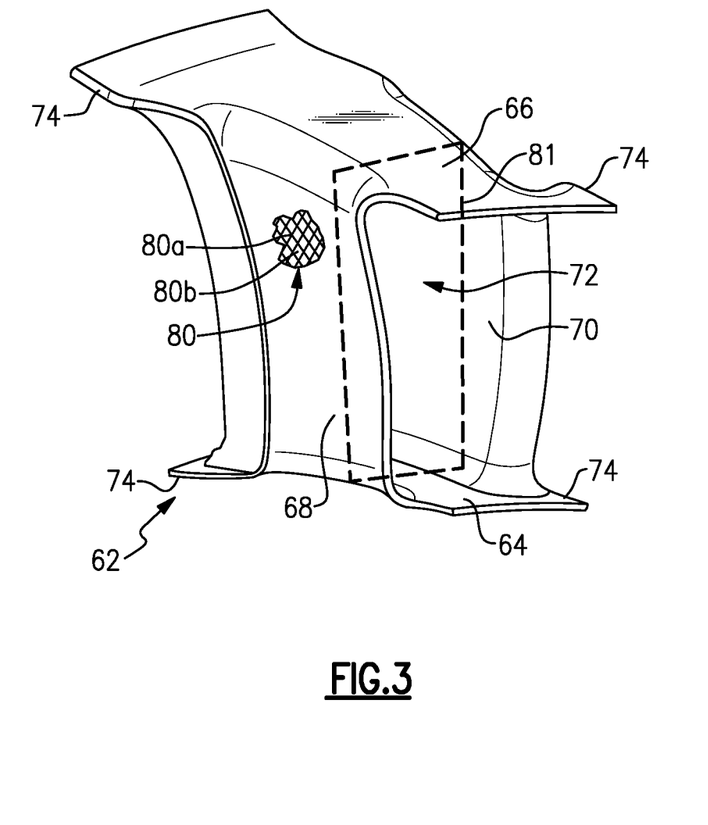
FIG. 3 illustrates a fiber-reinforced composite airfoil ring.

Each vane assembly 60 includes a pair of fiber-reinforced composite airfoil rings 62 that are identical or substantially identical, a representative one of which is shown in an isometric view in FIG. 3. Each ring 62 is composed of inner and outer platform sections 64/66, a suction side wall 68 that extends between the inner and outer platform sections 64/66, and a pressure side wall 70 that also extends between the inner and outer platform sections 64/66. The inner and outer platform sections 64/66, the suction side wall 68, and the pressure side wall 70 include mate faces 74. Together, the inner and outer platform sections 64/66, the suction side wall 68, and the pressure side wall 70 form a ring that circumscribes an open throat 72 (see FIG. 3) through which the combustion gases will expand in the core gas path.

Referring again to FIG. 2, in each vane assembly 60 a first one of the rings 62 mates with a second, adjacent one of the rings 62 in an interface 76. The interface 76 refers to the boundary region of the mate faces 74 when the mate faces 74 are aligned substantially flush with each other in their final assembled position. The suction side wall 68 of the first ring 62 and the pressure side wall 70 of the second ring 62 together form an airfoil 75 that circumscribes an internal cavity 78. The airfoil 75 defines a leading edge 75a and a trailing edge 75b. In the illustrated example, the interface 76 runs along the inner and outer platform sections 64/66 and along the leading and trailing edges 75a/75b of the airfoil 75. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The two halves 62 need not be actually secured to each other. They may be fastened to an external support ring on the outer diameter and/or inner diameter of the halves 62.

There could also be an alternate embodiment where there is an internal support spar that holds onto adjacent hardware at the inner diameter to help support the entire combination.

Each ring 62 is an endless loop in that the inner and outer platform sections 64/66, suction side wall 68, and pressure side wall 70 constitute a unitary body. As an example, the ring 62 is fabricated of a fiber-reinforced composite 80 (shown in partial cutaway view in FIG. 3). The fiber-reinforced composite 80 is comprised of a network of fiber tows 80a disposed in a matrix 80b. A fiber tow is a bundle of filaments. As an example, a single tow may have several thousand filaments. The tows 80a may be arranged in a fiber architecture, which refers to an ordered arrangement of the tows 80a relative to one another. For instance, the fiber structure is a braided architecture (e.g., bi- or tri-axial braid). In the illustrated example in FIG. 3, the fiber tows 80a are provided as an endless braid, represented schematically at 81, around the throat 72. The endless braid 81 thus resembles a woven sleeve that has no seams.

The fiber-reinforced composite 80 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum.

Figure 4:
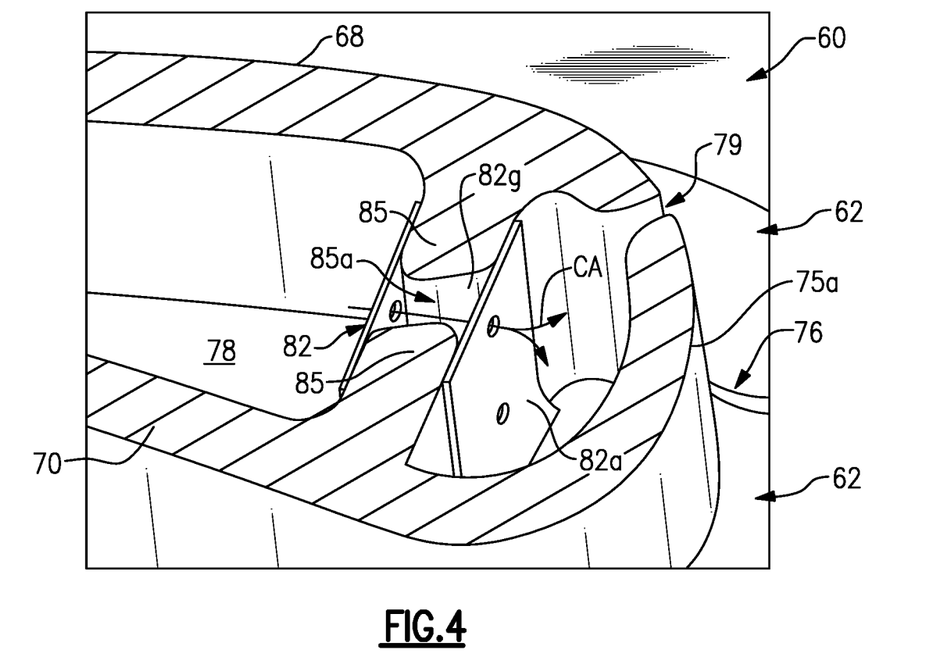
FIG. 4 illustrates an example of a vane assembly with a metering seal and rib gussets.

In a further example shown in FIG. 4, the airfoil assembly 60 includes a metering seal 82 in the internal cavity 78. The metering seal 82 is disposed proximate a gap 79 in the airfoil 75 and straddles rib gussets 85 that extend from the walls 68/70 into the cavity 78. The rib gussets 85 are radially elongated ridges that span the full or substantially full radial extent of the airfoil 75. Since the airfoil 75 is formed by initially separate rings 62, there is no internal integrated rib between the suction and pressure side walls 68/70 as there might be in some conventional airfoils. In that regard, the rib gussets 85 serve for strengthening and/or stiffening the suction and pressure side walls 68/70 in place of a rib.

The metering seal 82 and rib gussets 85 divide the internal cavity 78 into forward and aft sub-cavities. The rib gussets 85 define a passage 85a there between for flow of cooling air (CA). The metering seal 82 is formed of a porous body 82a that is configured to meter flow of the cooling air (CA) through the passage 85a to the gap 79 in the airfoil 75. As shown, the metering seal 82 is located near the leading edge 75a. However, the metering seal 82 may alternatively be located near the trailing edge 75b, or an additional metering seal 82 may be provided near the trailing edge 75b.

Figure 5:
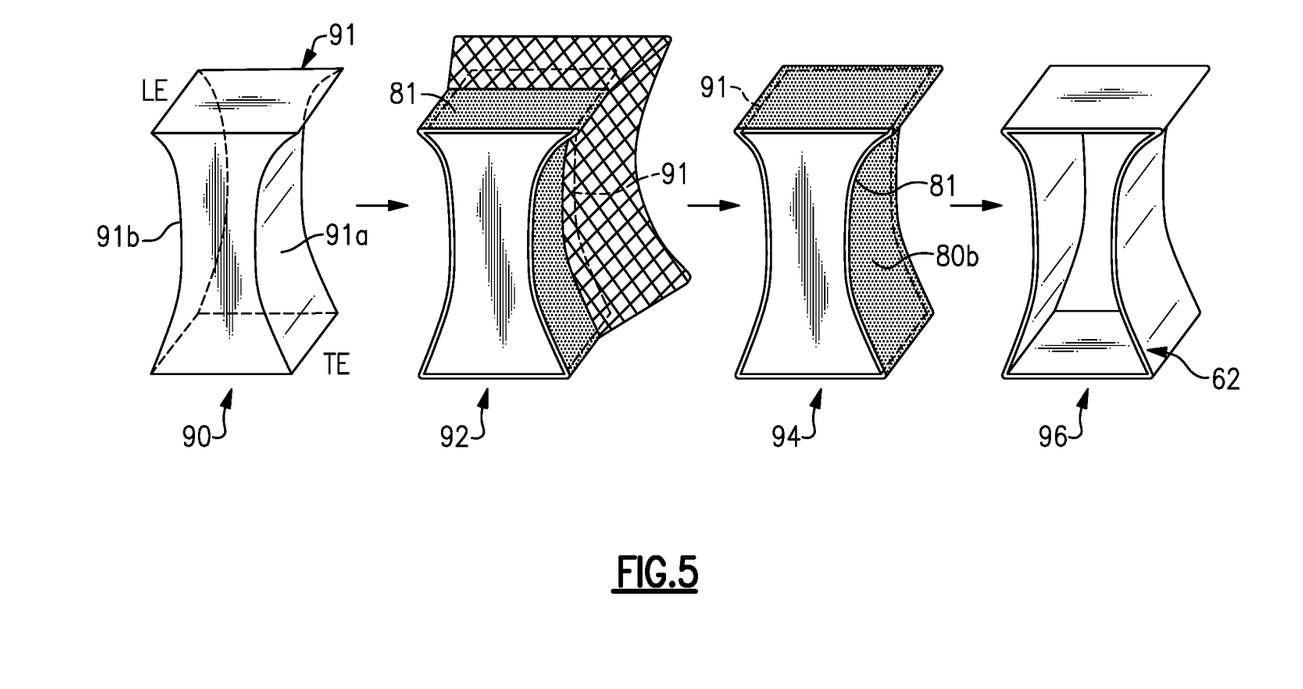
FIG. 5 illustrates a method of fabricating a fiber-reinforced composite airfoil ring.

FIG. 5 illustrates a method of fabricating the fiber-reinforced airfoil ring 62. At 90, the method includes providing a mandrel 91 that has a mandrel suction side 91a and mandrel pressure side 91b. As will be appreciated, the mandrel 91 is shown representatively and the actual geometry will reflect the design shape of the rings 62. For example, the mandrel 91 is made of carbon graphite, although it may alternatively be made of another material that has sufficient strength and durability for the processing. At 92, the method includes forming the endless braid 81 around the mandrel 91. For instance, the forming includes weaving the braid 81 using a loom or other known device. The endless braid 81 conforms to the mandrel suction side 91a and the mandrel pressure side 91b. At 94 the method includes consolidating the endless braid 81 with the matrix material 80b. For example, the consolidation includes chemical vapor infiltration of the endless braid 81 with the matrix material 80b. The consolidation is not limited, however, and other processes such as, but not limited to, polymer infiltration and pyrolysis may additionally or alternatively be used. Finally, at 96 the method includes removal of the mandrel 91, leaving the final ring 62. As an example, the mandrel 91 may be slid out of the ring 62. Alternatively, the mandrel 91 may be provided in several pieces that facilitate removal.

Details of the features described above can be best understood from co-pending U.S. patent application Ser. No. 17/215,513 filed on Mar. 29, 2021, and entitled "Airfoil Assembly With Fiber-Reinforced Composite Rings" and owned by the Assignee and Applicant of this application. The disclosure of that application is hereby incorporated by reference.

Figure 6:
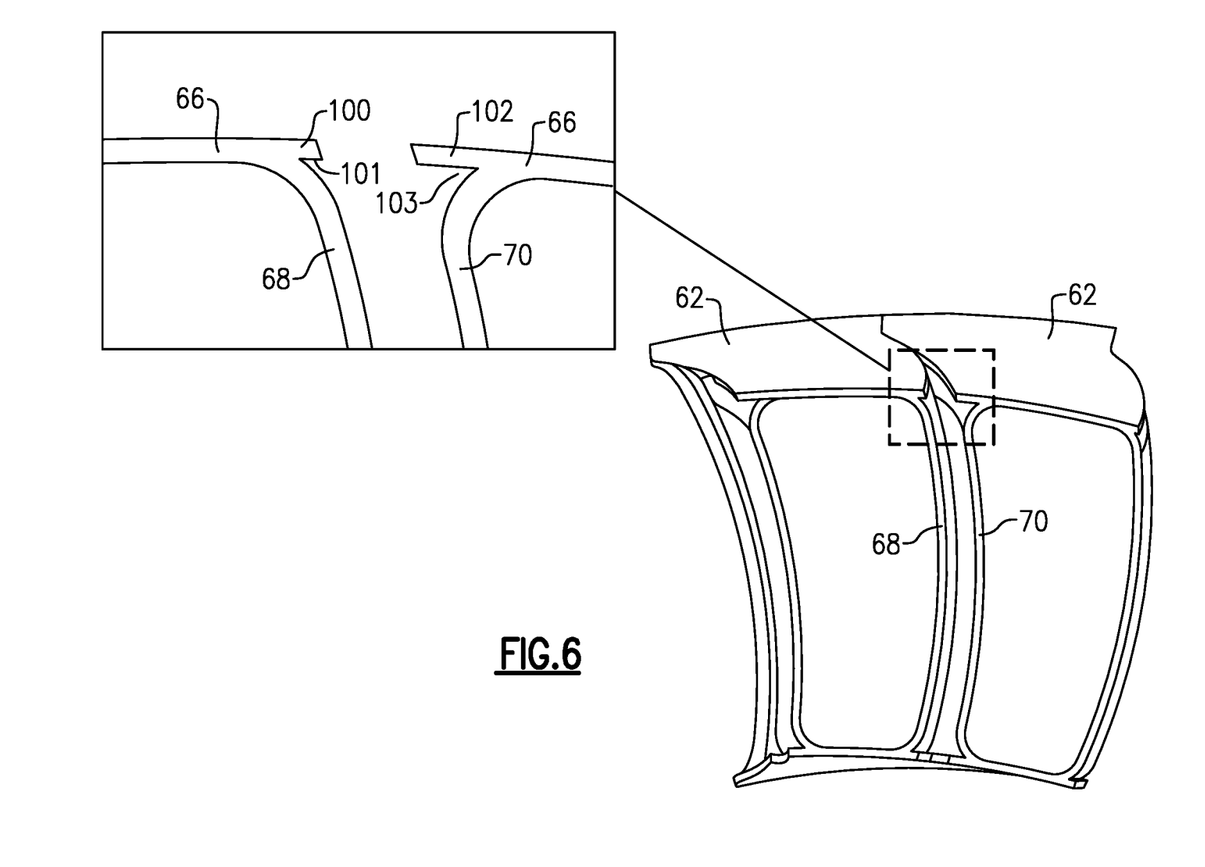
FIG. 6 shows a detail of sealing shelves in a disclosed embodiment.

FIG. 6 shows a further features of two of the adjacent airfoil rings 62, with a suction side wall 68 and a pressure side wall 70. As shown in the expanded portion, suction side wall 68 has a sealing shelf 100 extending from the upper platform 66 and defining an included triangular space 101. Similarly, the pressure side wall 70 has a sealing shelf 102 extending from the upper platform 66 defining a triangular space 103. Similar shelves and spaces are formed at the radially inner platform.

Figure 7:
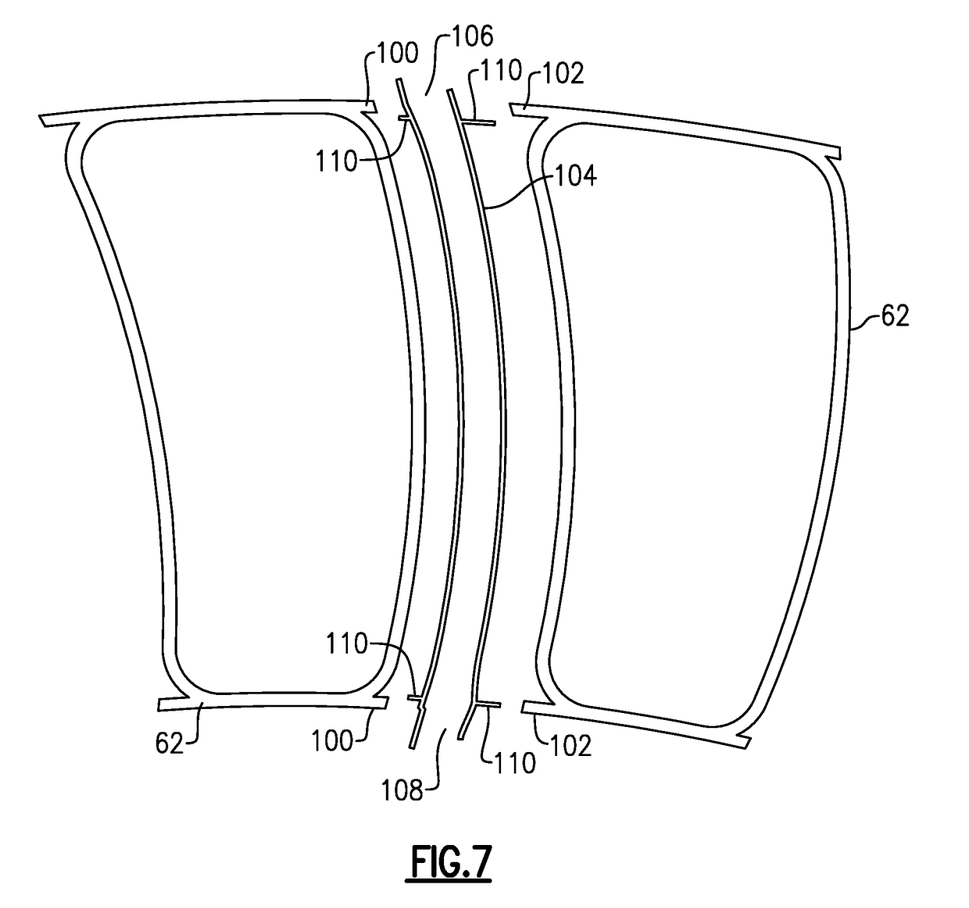
FIG. 7 shows further details of an included jumper tube.

FIG. 7 shows a pair of airfoil rings 62 and their shelves 100 and 102 positioned outwardly of a jumper tube 104. As known, a jumper tube 104 brings pressurized air, such as for cooling, from an inlet 106 to an outlet 108. Flanges 110 on the jumper tube will be positioned inwardly of the sealing shelves 100 and 102 when the vane is assembled.

Figure 8:
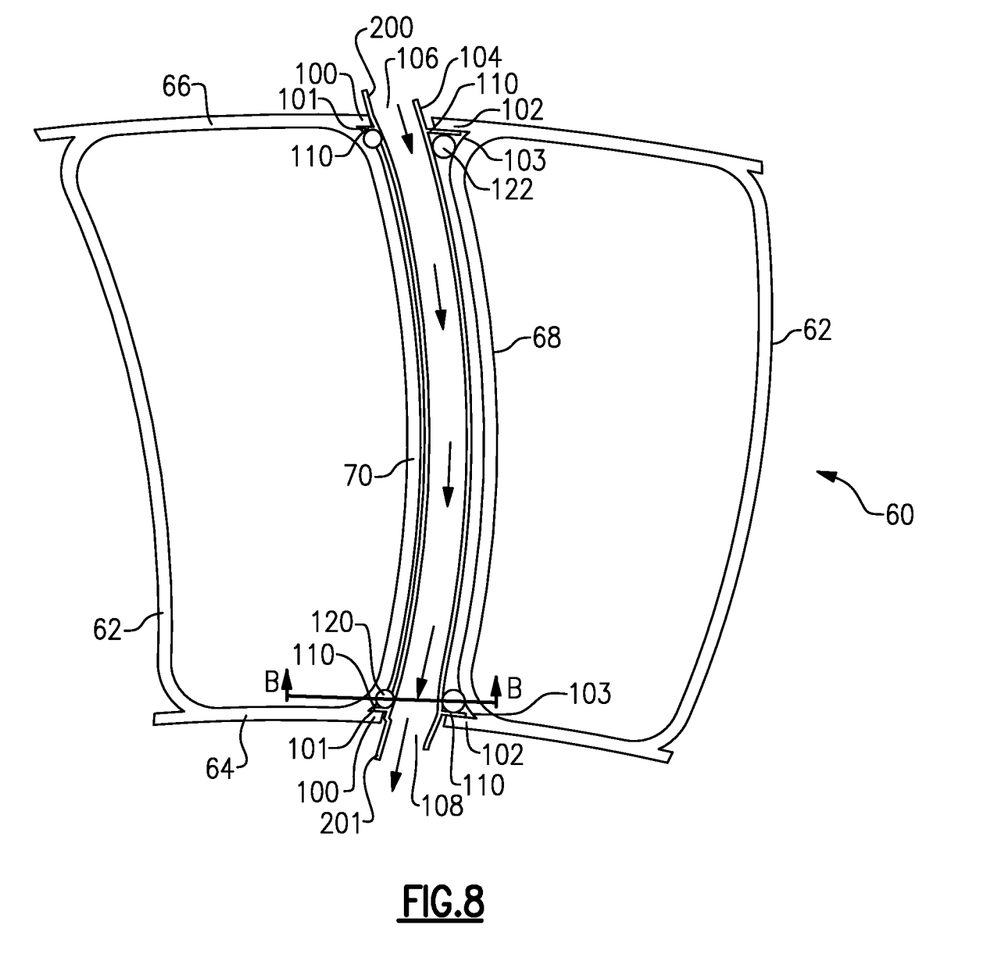
FIG. 8 shows an assembled vane including the jumper tube.

FIG. 8 shows the assembled vane 60. The flanges 110 are positioned inwardly of the shelves 100 and 102. The flanges are flexible and thin such that they provide a bias force inwardly against included seals 120 and 122. The seals are forced into the triangular spaces 101 and 102. As such, very reliable seals against leakage are provided at the opposed sides of the jumper tube 104. A jumper tube may be utilized if a designer is confident that the airfoil rings 62 do not need additional cooling. It serves to isolate cooling air being delivered to downstream components. As can be seen the jumper tube 104 has ends 200 and 201 that extend radially beyond the platforms 64 and 66.

Figure 9:
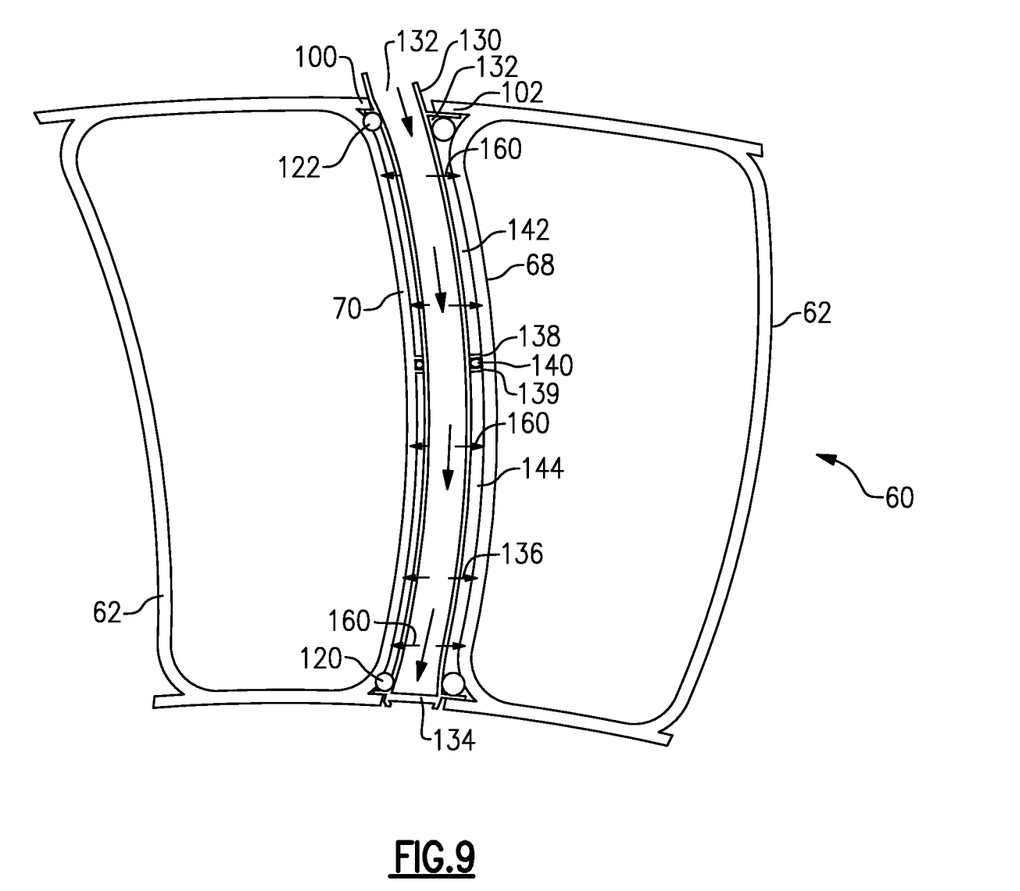
FIG. 9 shows an assembled vane having a baffle.

FIG. 9 shows a vane 60 wherein a baffle tube 130 is positioned between the rings 62. Baffle tube 130 has an inlet 132 delivering air radially inwardly toward a dead end wall 134. A plurality of cooling impingement holes 160 deliver cooling air to cool the suction and pressure faces 68 and 70.

One other optional feature is illustrated wherein additional seal shelves 138 and 139 are formed on the baffle. The baffle also has flanges 132 which are thin and flexible as in the jumper tube embodiment.

The baffle 130 has additional intermediate shelves 138 and 139 capturing an intermediate seal 140. Seal 140 may surround the baffle tube.

By including the intermediate seals and shelves, distinct pressure regions 142 and 144 may be defined in the cavity between the pressure and suction walls 68 and 70. This feature may also be used on a jumper tube.

Returning to FIG. 2 momentarily, shower head cooling holes 200, 201, 202 may be formed in the airfoil. A necessary pressure to deliver air outwardly of the holes 200, 201 and 202 may differ between a radially inner end and a radially outer end. By providing the sub zones 142 and 144, the pressure being delivered to a particular hole 200, 201 and 202 may be tailored as necessary. This will increase the efficiency of cooling and the use of compressed air. While a single intermediate seal 140 is illustrated, it should be understood that a greater number of intermediate seals may be utilized to provide more than two sub zones.

A combination of a baffle tube and jumper tube may also use this concept. It would deliver air to downstream components, but also cool the rings 62.

The seals 120 and 122 may be flexible metallic C seals, rope seals made of a high temperature resistant fabric or any other high temperature seal that can be deformed into spaces 101 and 103. The seals 120 and 122 may each be a one piece seal with a split end, such as at a trailing edge.

An airfoil assembly under this disclosure could be said to include first and second fiber-reinforced composite airfoil rings each having inner and outer platform sections. A suction side wall extends between the inner and outer platforms, and a pressure side wall extends between the inner and outer platforms. The first fiber-reinforced composite airfoil ring mates at an interface with the second fiber-reinforced composite airfoil ring such that the suction side wall of the first fiber-reinforced composite airfoil ring and the pressure side wall of the second fiber-reinforced composite airfoil ring together form an airfoil. There is a sealing shelf extending from the suction side wall of one of the first and second fiber-reinforced composite airfoil rings, and extends toward the pressure side wall of the other of the first and second fiber-reinforced composite rings. The sealing shelves are formed as an extension from each of the inner and outer platforms on each of the first and second fiber-reinforced composite airfoil rings. A first seal is captured radially inwardly of the sealing shelves on the outer platforms of each of the first and second fiber-reinforced composite airfoil rings and a second seal captured inward of the sealing shelves on the inner platforms of each of the first and second fiber-reinforced composite rings to provide a seal between the respective first and second fiber-reinforced composite airfoil rings, and a captured internal component.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil assembly comprising:
first and second fiber-reinforced composite airfoil rings each having inner and outer platform sections, a suction side wall extending between the inner and outer platforms, and a pressure side wall extending between the inner and outer platforms, the first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil; and
there being a sealing shelf extending from said suction side wall of one of said first and second fiber-reinforced composite airfoil rings, and extending toward the pressure side wall of the other of said first and second fiber-reinforced composite rings, with said sealing shelves being formed as an extension from each of said inner and outer platforms on each of said first and second fiber-reinforced composite airfoil rings, and a first seal being captured radially inwardly of said sealing shelves on outer platforms of each of said first and second fiber-reinforced composite airfoil rings and a second seal captured inward of said sealing shelves on the inner platforms of each of said first and second fiber-reinforced composite rings to provide a seal between said respective first and second fiber-reinforced composite airfoil rings, and a captured internal component.

2. The airfoil assembly as recited in claim 1, wherein the airfoil defines a leading edge and a trailing edge, and the interface extends through at least one of the leading edge or the trailing edge.

3. The airfoil assembly as recited in claim 1, wherein each of the first and second fiber-reinforced composite airfoil rings includes an endless braid.

4. The airfoil assembly as recited in claim 3, wherein the fiber-reinforced composite of the first and second fiber-reinforced composite airfoil rings is ceramic matrix composite.

5. The airfoil assembly as recited in claim 1, wherein the fiber-reinforced composite of the first and second fiber-reinforced composite airfoil rings is ceramic matrix composite.

6. The airfoil assembly as recited in claim 1, wherein said captured internal component is a jumper tube having an inlet to be connected to receive compressed air and deliver air to an opposed radial side of the inlet to an outlet.

7. The airfoil assembly as recited in claim 1, wherein said captured component is a baffle tube, having an inlet to receive compressed air, and having a plurality of impingement cooling holes to deliver the compressed air to the suction side wall of one of said fiber-reinforced composite airfoil rings, and also to the pressure side wall of the other of said first and second fiber-reinforced composite airfoil rings.

8. The airfoil assembly as set forth in claim 7, wherein there is at least one intermediate sealing shelf receiving at least one intermediate seal between the radially inner and outer platforms, to provide subpressure chambers within a cavity defined between said first and second fiber-reinforced composite airfoil rings, and there being film cooling holes in an outer face of said airfoil associated with each of said plurality of subpressure zones.

9. The airfoil assembly as set forth in claim 1, wherein said captured internal component has flanges which are thin and flexible and received between said sealing shelves associated with said inner and outer platforms and said first and second seals.

10. The airfoil assembly as set forth in claim 1, wherein said each of said sealing shelves associated with said pressure side wall and said suction side wall, and at said inner and outer platforms defining a triangular space such that said first and second seals are forced into a compressed position in said triangular space.

11. A gas turbine engine comprising:
a compressor section;
a combustor in fluid communication with the compressor section; and
a turbine section in fluid communication with the combustor, the turbine section having a plurality of airfoil assemblies disposed about a central axis of the gas turbine engine, each of the airfoil assemblies includes:
first and second fiber-reinforced composite airfoil rings each having inner and outer platform sections, a suction side wall extending between the inner and outer platforms, and a pressure side wall extending between the inner and outer platforms, the first fiber-reinforced composite airfoil ring mating at an interface with the second fiber-reinforced composite airfoil ring such that the suction side wall of the first fiber-reinforced composite airfoil ring and the pressure side wall of the second fiber-reinforced composite airfoil ring together form an airfoil, and a plurality of first and second fiber-reinforced composite airfoil rings circumscribes a rotational axis of the engine; and there being a sealing shelf extending from said suction side wall of one of said first and second fiber-reinforced composite airfoil rings, and extending toward the pressure side wall of the other of said first and second fiber-reinforced composite rings, with said sealing shelves being formed as an extension from each of said inner and outer platforms on each of said first and second fiber-reinforced composite airfoil rings, and a first seal being captured radially inwardly of said sealing shelves on the outer platforms of each of said first and second fiber-reinforced composite airfoil rings and a second seal captured inward of said sealing shelves on the inner platforms of said first and second fiber-reinforced composite rings to provide a seal between said respective first and second fiber-reinforced composite airfoil rings, and a captured internal component.

12. The gas turbine engine as recited in claim 11, wherein the airfoil defines a leading edge and a trailing edge, and the interface extends through at least one of the leading edge or the trailing edge.

13. The gas turbine engine as recited in claim 11, wherein each of the first and second fiber-reinforced composite airfoil rings includes an endless braid.

14. The gas turbine engine as recited in claim 13, wherein the fiber-reinforced composite of the first and second fiber-reinforced composite airfoil rings is ceramic matrix composite.

15. The gas turbine engine as recited in claim 11, wherein the fiber-reinforced composite of the first and second fiber-reinforced composite airfoil rings is ceramic matrix composite.

16. The gas turbine engine as recited in claim 11, wherein said captured internal component is a jumper tube having an inlet to be connected to receive compressed air and deliver air to an opposed radial side of the inlet to an outlet.

17. The gas turbine engine as recited in claim 11, wherein said captured component is a baffle, said baffle having an inlet to receive compressed air, and having a plurality of impingement cooling holes to deliver the compressed air to the suction side wall of one of said fiber-reinforced composite airfoil rings, and also to the pressure side wall of the other of said first and second fiber-reinforced composite airfoil rings.

18. The gas turbine engine as set forth in claim 17, wherein there is at least one intermediate sealing shelf receiving at least one intermediate seal between the radially inner and outer platforms, to provide subpressure chambers within a cavity defined between said first and second fiber-reinforced composite airfoil rings, and there being film cooling holes in an outer face of said airfoil associated with each of said plurality of subpressure zones.

19. The gas turbine engine as set forth in claim 11, wherein said captured internal component has flanges which are thin and flexible and received between said sealing shelves associated with said inner and outer platforms and said first and second seals.

20. The gas turbine engine as set forth in claim 11, wherein said each of said sealing shelves associated with said pressure side wall and said suction side wall, and at said inner and outer platforms defining a triangular space such that said first and second seals are forced into a compressed position in said triangular space.

* * * * *